United States Patent [19]

Hicks

[11] Patent Number: 4,553,433
[45] Date of Patent: Nov. 19, 1985

[54] ROTARY METER WITH INTEGRAL INSTRUMENT HOUSING

[75] Inventor: Irwin A. Hicks, Radnor, Pa.

[73] Assignee: The Singer Company, Stamford, Conn.

[21] Appl. No.: 494,598

[22] Filed: May 13, 1983

[51] Int. Cl.[4] ............................................. G10F 15/14
[52] U.S. Cl. ..................................... 73/273; 73/861.77
[58] Field of Search ................. 73/233, 253, 258, 273, 73/274, 431, 861.01, 861.02, 861.03, 861.77, 861.87, 861.88, 861.78

[56] References Cited

U.S. PATENT DOCUMENTS

| | | | |
|---|---|---|---|
| 3,731,534 | 5/1973 | Painley et al. | 73/273 |
| 3,748,903 | 7/1973 | Irie et al. | 73/261 |
| 3,949,606 | 4/1976 | Blancett | 73/861.87 |
| 4,111,042 | 9/1978 | Bryant | 73/861.01 |
| 4,140,013 | 2/1979 | Hunger | 73/861.77 |
| 4,408,695 | 10/1983 | Balkwill et al. | 220/3.3 |

Primary Examiner—S. Leon Bashore
Assistant Examiner—Andrew J. Anderson
Attorney, Agent, or Firm—David L. Davis; Robert E. Smith; Edward L. Bell

[57] ABSTRACT

A rotary meter with an integral instrument housing is arranged so that the rotating components of the meter rotate about vertical axes. The meter includes upper and lower housings which together form a pressure hull. A cover is provided to be connected to the upper housing and define therewith an instrument enclosure. All instruments are mounted on the upper housing within the enclosure. The cover and upper housing are constructed to provide a secure, tamper resistant, environment for the instruments.

8 Claims, 8 Drawing Figures

ROTARY METER WITH INTEGRAL INSTRUMENT HOUSING

DESCRIPTION

Background of the Invention

This invention relates to fluid meters and, more particularly, to a rotary positive displacement fluid meter.

The function of a fluid meter is to measure, as accurately as possible, the volume of fluid passing through the meter. The volume measurement of gaseous fluids, however, is actual volume as the meter perceives it (irrespective of the well-known effects of temperature, pressure, gas composition, and specific gravity of the gas). It is therefore very common for rotary meters to have separately mounted instruments, or "correctors", attached to the meter to change the actual volume to the corrected, or standard, volume. These correctors perform a mechanical or electronic recalculation of the actual volume to the standard volume. The standard volume is the unit of volume contractually specified as the conditions of a gas for sale. This standard volume is typically set at some temperature (such as 60° F.), some pressure (such as 14.7 psia), some gas composition, and some specific gravity (such as 0.6 S.G.). Correctors, therefore, function to recalculate actual measured volume to standard volume which is the contracted unit of purchase/sale.

As gas conditions can change instantaneously, it is very desirable, indeed almost mandatory, to calculate the gas correction in "real time" upon the actual volume being measured at that time. It is therefore common to mount a correcting instrument on each individual meter, particularly higher capacity meters such as a rotary meter.

In addition to volume correctors, other kinds of instruments are frequently mounted on rotary meters. For instance, a "recorder" may sometimes be mounted on a rotary meter. A typical contemporary recorder has a paper transport (such as a circular or strip chart) upon which marks in ink are made for the parameters of actual volume, temperature, and pressure. This chart serves the function of a permanent record of gas conditions usable for billing, contract compliance, and in case of disputes. Other types of instruments are for electronic recording, gas density measurement, and various data transmitting equipment to remote locations.

At present, such instrumentation is frequently mounted as a separate module on the rotary meter. One exception is that some rotary meters have temperature volume correction as an integral part of the rotary meter. Another exception is that the readout device, commonly called the "index", may have a special gear train which multiplies the actual volume by a fixed ratio based on an assumed operating pressure; such devices are called a fixed factor pressure index. However, due to the rapidly increasing cost of petroleum based gaseous fuels, the incidence of real time correction for gas conditions is increasing rapidly due to the desire for accurate measurement; module type instruments are more commonly specified with the rotary meter. It is therefore an object of this invention to provide an instrument enclosure integral to the rotary meter in order to eliminate external modular instrument housings.

All known rotary meters, of any type, utilize horizontal shafting for mounting the metering rotating components. As module instruments (correctors and recorders for instance) typically are mounted for vertical shaft input into the instrument, it is therefore typical to provide a gear train in a mountable housing to transfer horizontal rotation to vertical rotation and to provide a module instrument mounting pad and drive connection. The additional expense of this right angle instrument drive and the difficulty of specification is an impediment to volume correction and other such instruments. It is therefore another object of this invention to provide a rotary meter whose output is vertical.

Further, the input of gas conditions for such module instruments comes from taps into adjoining piping. Flowing gas temperature is typically obtained from a tap into the pipe called a "thermowell". Thermowells not only require an intrusion through the pipe wall, but also require sizing to the pipe diameter (there are many sizes of commonly used piping). Because thermowells may be some distance from the meter mounted instrument, it is common to have compensation for the change in measurement due to ambient temperature conditions; a specification difficulty is the length of thermowell connection capillary or cable to the module. This thermowell interconnection requires structural and weather protection (typically a sheathing of spiral stainless steel). Such thermowell connections to the meter also require an interface, or attachment, to the instrument module which typically requires cable strain relief and sometimes module housing hole drilling in the field to accommodate special mounting conditions. Such work on the piping in the field, the difficulty of apparatus specification, and the expense of such apparatus are all impediments to the use of volume correction and other such instruments. It is, therefore, a further object of this invention to provide apparatus for sensing flowing gas temperature, which apparatus is internal to the meter housing.

Flowing gas pressure for external instruments is typically obtained from a tap into the pipe called a "pressure tap". Pressure taps not only require an intrusion through the pipe wall, but also require at least one valve (or a manifold for multiple functions). Such pressure taps are commonly field piped to the instrument module where another pressure connection is typically provided for the convenience of removing the module; sometimes it is necessary to drill a hole in the module housing in the field for special conditions. Such work on the piping in the field, the difficulty of apparatus specification, and the expense of such apparatus are all impediments to the use of volume correction on rotary meters. It is therefore yet another object of this invention to provide apparatus for sensing flowing gas pressure, which apparatus is internal to the meter housing.

Besides external temperature and pressure sensing connections at the instrument module, there is increasing use of other types of instruments, especially electronic devices, which require connection to the external instrument housing, frequently requiring either difficult ordering specifications or hand drilling of the housing in the field. The expense and potential reduction of quality of product are impediments to the use of such equipment. It is therefore still another object of this invention to provide a convenient means for providing external connection holes in an integral instrument enclosure of a rotary meter.

Electronic instruments (for instance, for correcting gas volume, recording, and retransmission of data) are rapidly increasing for use with rotary meters. As typical 110 v line power cannot be connected to the instrument housing, modular or integral, for safety reasons (dangerous fuel), such power must be rendered "intrinsically safe" by equipment which typically reduces the voltage and rectifies to direct current for use within the area of the meter and/or instrument. This equipment and installation expense is an impediment to the use of such electronic instruments. In some cases, the power line and protection is such an impediment that consumable batteries are used; in itself an impediment to the use of electronic instruments due to the expense of maintenance. Further, many types of commercially available batteries are unsuitable for certain ambient temperature conditions which preclude the use of electronic instruments. It is therefore yet a further object of this invention to provide a rotary meter electrical power generator.

Due to the rapidly increasing cost of petroleum based gaseous fuels, fuel theft by tampering with the meter (to reduce or eliminate its measurement) is increasing rapidly, becoming a major concern of utilities and gas distributors. External instrument modules and their external sensing lines are particularly vulnerable to fuel theft and vandalism. It is therefore still a further object of this invention to provide a rotary meter and integral instrument enclosure which significantly deters fuel theft and vandalism.

SUMMARY OF THE INVENTION

The foregoing and additional objects are attained in accordance with the principles of this invention by providing in a rotary fluid meter, the combination of a lower housing and an upper housing together forming a pressure hull for the meter for connection in a pipeline, the lower and upper housings being adapted to contain the rotating measurement elements of the meter on vertical axes of rotation, and a cover adapted for connection to the upper housing to define therewith an enclosure outside the pressure hull for containing fluid measurement instruments, the upper housing being formed with integral instrument mountings outside the pressure hull adapted to be within the enclosure when the cover is connected to the upper housing.

DESCRIPTION OF THE DRAWINGS

The foregoing will be more readily apparent upon reading the following description in conjunction with the drawings in which like elements shown in different figures thereof have the same reference character applied thereto and wherein.

DETAILED DESCRIPTION

Figures 1, 1A, 1B:
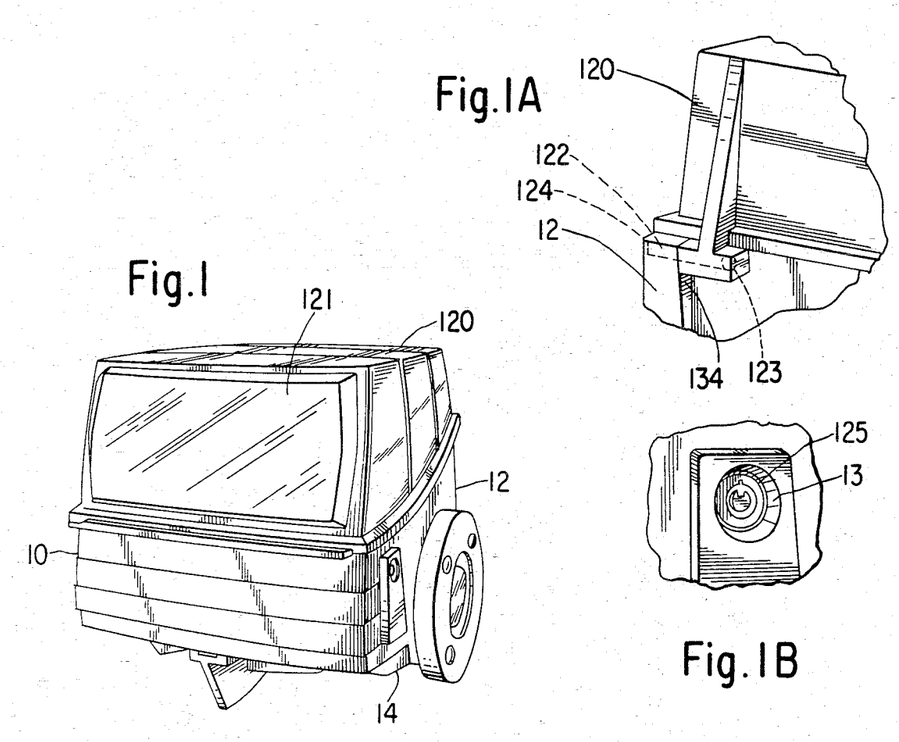
FIG. 1 is a perspective view of a rotary meter including an instrument enclosure cover.
FIG. 1A is a perspective view of a hinge detail of FIG. 1.
FIG. 1B is a perspective view of a lock detail of FIG. 1.

Referring now to the drawings, shown therein is a meter constructed in accordance with the principles of this invention. The meter, designated generally by the reference numeral 10, includes an upper housing member 12, a lower housing member 14, and an instrument cover 120. FIG. 1 shows a perspective view of a rotary meter of the flanged inlet/outlet type with an instrument cover 120 including an instrument cover window 121.

FIG. 1A is a perspective view of the back of the instrument cover 120 and upper housing 12 showing a detail of one of two hinges rotatably connecting the two parts. The construction is such that the instrument cover 120 casting either encloses one end of the hinge pin 122 in a blind hole 123 or the upper housing 12 casting encloses the other end of the hinge pin 122 in a blind hole 124, thus trapping the hinge pin 122 such that it cannot be removed (i.e., with a tool, such as a punch) when the instrument cover 120 is closed. It should be understood that this arrangement is similar to a typewriter case hinge (that both hinge bosses of the upper housing 12 are on the same side of the split plane 134 between bosses of the upper housing 12 and instrument cover 120 perpendicular to the axis of the hinge pin 122, and that both hinge bosses of the instrument cover 120 are on the opposite side of their respective split planes 134), which, for machining purposes, dictates that in the illustration the hinge bore 124 in the upper housing 12 be a through bore whereas it is a blind bore on the other hinge boss of the upper housing 12 (the opposite arrangement being used on the other hinge combination).

FIG. 1B is a perspective view of the side of upper housing 12 showing a detail of one of two identical key locks 125 recessed in a counterbore 13 of the upper housing 12. The lock 125 is one of two significantly protected key locks to secure the instrument cover 120 in its closed position. The recess 13 prevents the use of tools (such as pliers) to remove the lock from the upper housing. Shown in the lock detail is a high security circular key type lock commonly used for equipment subject to vandalism (i.e., vending machines), but the lock may be of any type of suitable construction.

Figure 2:
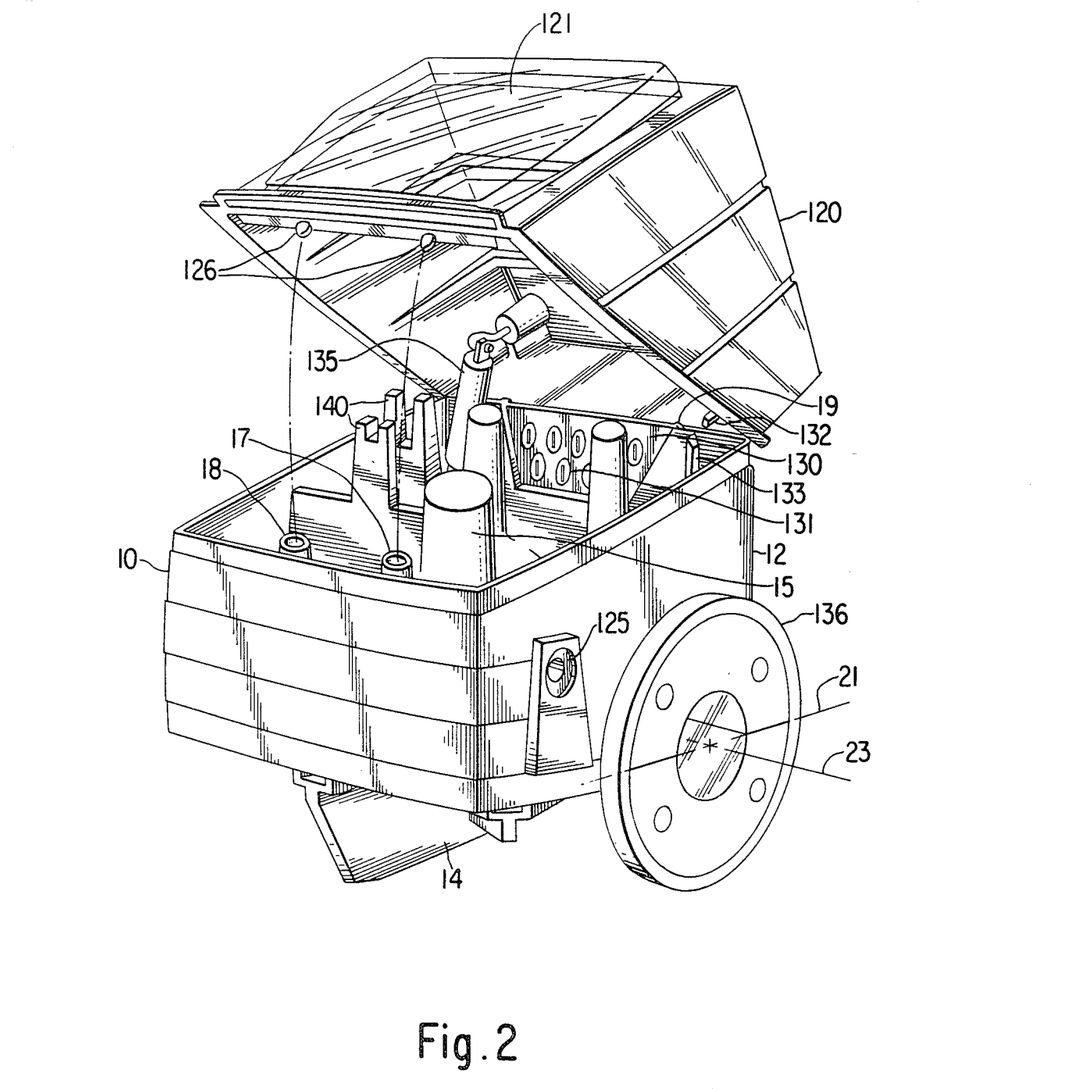
FIG. 2 is a perspective view of a rotary meter with the instrument enclosure cover in its open position.

FIG. 2 is a perspective view of a rotary meter 10 of the flanged inlet/outlet type (as in FIG. 1) with the instrument cover 120 shown in the open position. The salient points of the illustration are to show the rotor bearing tower 15 in the upper housing 12; to show the two cover shot pins 126 which are fixedly attached to the instrument cover 120 which fit into two corresponding bores 17 and 18 in the upper housing 12 so that the cover 120 is captured on its front side when closed (as in FIG. 1); to show the interface plate 130 which slides down into slots 19 of the upper housing 12 such that the plate is captured by closing the instrument cover 120; to show that the interface plate 130 contains "electrician knockouts" 131 which are easily removed to provide an entrance hole for field applications requiring an external connection to the internal instruments (without the necessity of drilling a hole in the upper housing 12); to show a cam 132 in the instrument cover 120 whose tip is a wedge, and a cam 133 in the upper housing 12 whose tip is a wedge of opposite slope such that when the instrument cover 120 is closed, the two cams acting to close the space 134, if any, between the two parts of the instrument cover hinge as shown in FIG. 1A; to show that another purpose of cams 132 and 133 is that they form a side-by-side lock when the instrument cover 120 is closed, as in FIG. 1, such that the back of the instrument cover 120 cannot be moved horizontally off the hinge pins 122; to show an airspring 135 to hold the instrument cover 120 in the open position; to show typical instrument mounts 140 (other instruments may be mounted on the surface 60); and to show one of two steel flange rings 136 which are shrink fitted over the flange halves of the upper housing 12 and lower housing 14 after meter assembly.

Figure 3:
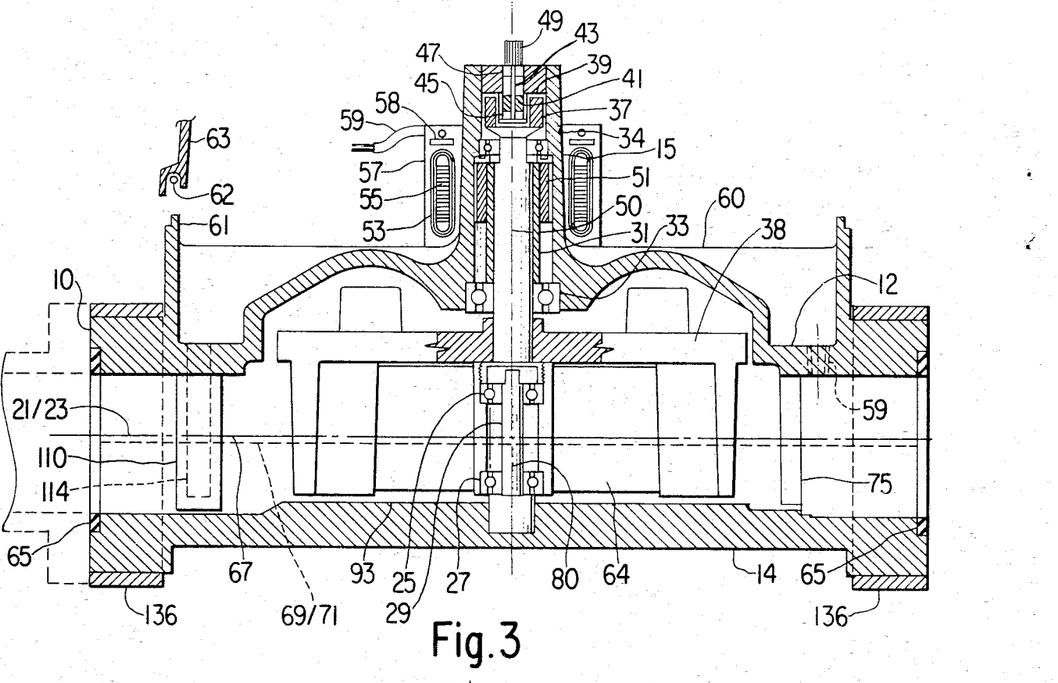
FIG. 3 is a sectional schematic view of a vane-type rotary meter with flanged type fluid inlet/outlet showing the split plane of the upper and lower housing.

FIG. 3 is sectional schematic view of the housing 10 of the flange-type inlet/outlet construction of FIG. 1 and FIG. 2 as viewed along the centerline connecting the axis 50 of the rotor 38 and the axis 80 of the gate 64. The salient points of this illustration are to show that the split plane 21 of a flange-type rotary meter intersects the centerline 23 of the flanges (the pipeline centerline), also shown in FIG. 2 in perspective; to show that the gate 64 is rotatably affixed by bearings 25 and 27 to a gate shaft 29 fixedly attached to the bottom housing 14 wherein the gate shaft 29 has a vertical centerline 80; to show that the rotor 38 is fixedly attached to the rotor shaft 31 which in turn is rotatably affixed by rotor bearings 33 and 34 to the housing 12 wherein the rotor shaft has a vertical centerline 50; to show that the rotor shaft 31 also has fixedly attached a drive magnet 37 which acts through a stainless steel seal cup 39 to magnetically drive a driven magnet 41; to show that the driven magnet 41 is fixedly mounted on an output shaft 43 which is rotatably mounted through output shaft bearings 45 and 47 to the seal cup 39, the output shaft 43 having a pinion 49 which is the input drive to instruments mounted within the instrument enclosure; to show that rotor shaft 31 also has fixedly attached a sleeved magnet 51 which acts as an alternator field core within the pressure hull of the meter 10 to provide the necessary flux (when rotating) to excite the windings 53 of the alternator core 55 (which is encapsulated at 57) and contains appropriate electronic circuitry 58 to rectify and control the current as to be suitable to charge batteries within the instrument enclosure through power leads 59; to show the steel shrink rings 136 on each flange which secure the upper housing 12 and lower housing 14 fixedly together after meter assembly; to show the level of gussets which is called the instrument level 60 (to which instruments within the instrument enclosure can be attached); to show the lipped wall 61 of the upper housing 12 which seals against a pliable elastomeric instrument cover seal 62 contained in the instrument cover wall 63 (a typical sectioned part of the lower edge of the instrument cover 120); and to show the flange seal elastomeric washers 65 which are bonded to elastomeric cylinders 67 which are trapped in grooves 69 and 71 (FIG. 6) of the lower housing 14 to provide an internal pressure seal between the upper housing 12 and the lower housing 14, and a seal between the meter housing 10 and the inlet/outlet flanged piping (shown in phantom).

Figure 4:
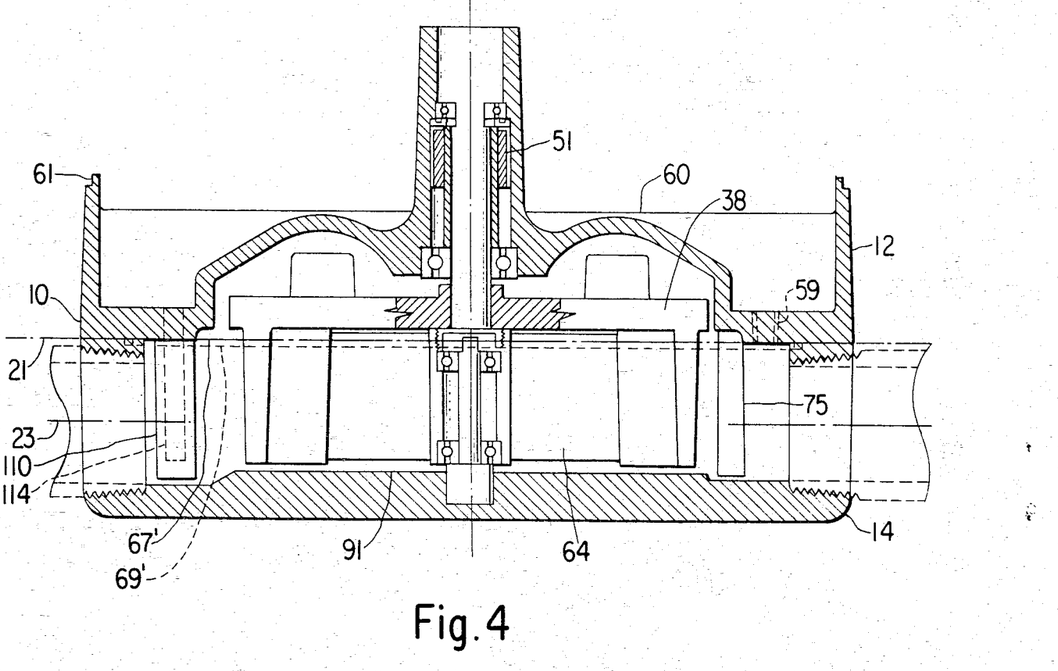
FIG. 4 is a sectional schematic view of a vane-type rotary meter with pipe tap type fluid inlet/outlet showing the split plane of the upper and lower housing.

FIG. 4 is similar to FIG. 3 in all respects (many details of FIG. 3 have been omitted for clarity) except that FIG. 4 shows the construction for a threaded piping (shown in phantom) type rotary meter. Thus there are no flange rings (136) and the seal between the upper housing 12 and lower housing 14 does not require flange seal washers (65) but does use an elastomeric cylinder 67' (in one piece) which is trapped in a groove 69' (same continuous groove) in the lower housing at the split plane 21.

Figure 5:
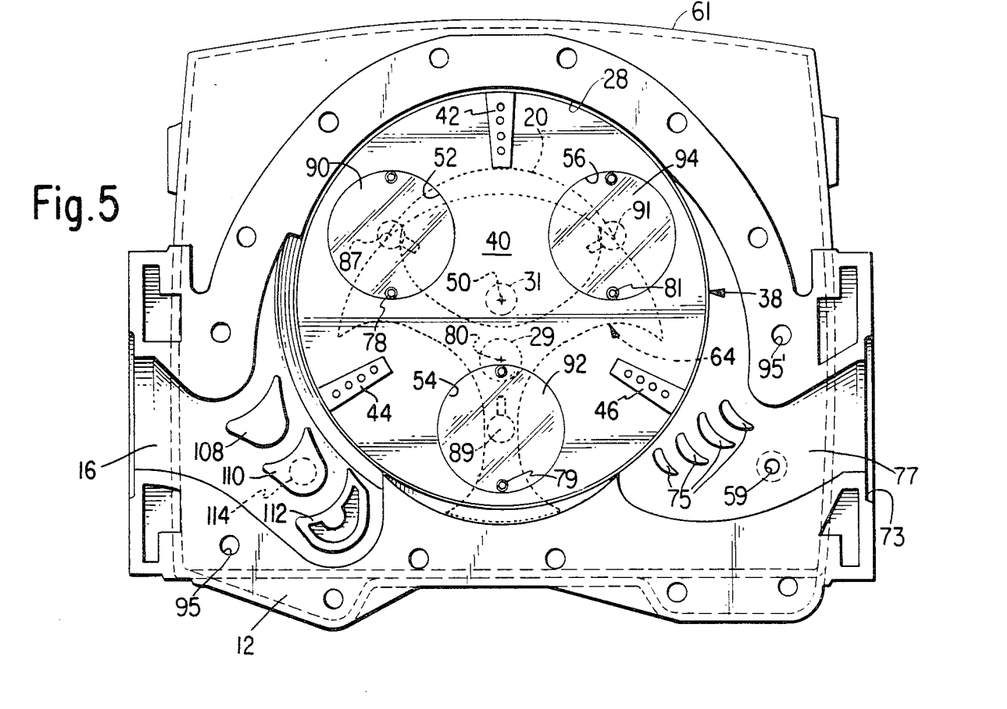
FIG. 5 is a plan view of the interior of the upper housing member showing the rotor in place and showing the placement of crescent and gate in phantom.

FIG. 5 is a plan view of the interior of the upper housing 12 showing the rotor 38 in place and showing the placement of crescent 20 and gate 64 in phantom; the housing construction shown being typical of a flange-type rotary meter as shown in FIG. 3. The salient points of this illustration are the instrument enclosure wall 61 (the inside surface shown in phantom), the turning vane 110 with a blind bore 114 (cored from the instrument enclosure side and thus shown in phantom) which acts as a temperature sensor "thermowell", and one (of several) pressure sensing ports 59 from the gas stream to the instrument enclosure side.

Figure 6:
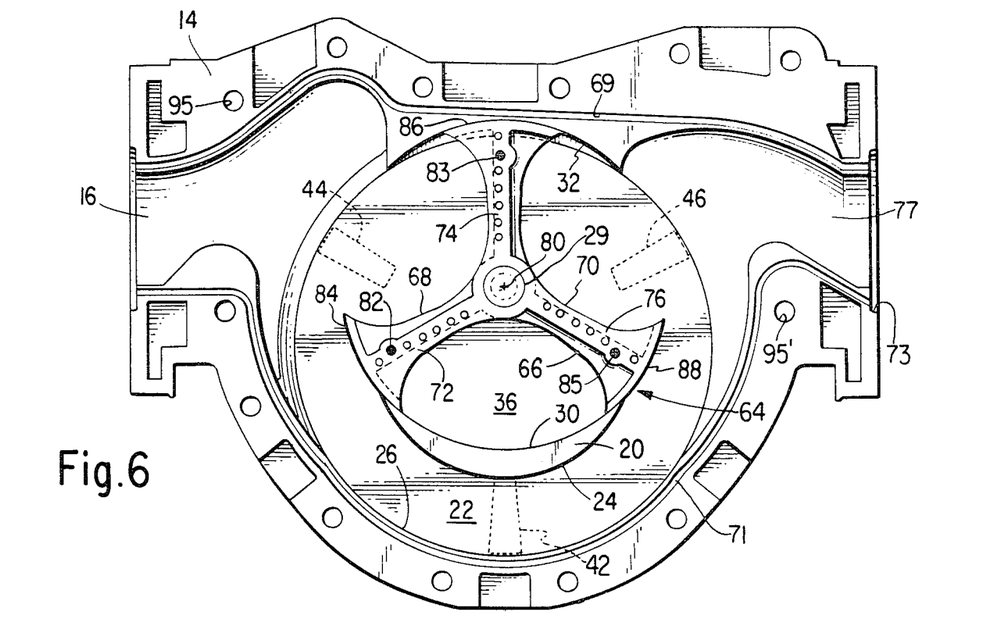
FIG. 6 is a plan view of the interior of the lower housing member showing the gate in place and showing the position of rotor vanes in phantom.

FIG. 6 is a plan view of the interior of the lower housing 14 showing the crescent 20 and gate 64 in place and showing the rotor vanes 42, 44, and 46 in phantom; the housing construction being typical of a flange-type rotary meter as shown in FIG. 3. The salient points of this illustration are the circular recesses 73 in both flange halves for the elastomeric flange washers 65 and the grooves 69 and 71 for the elastomeric cylinders 67 (the housing sealing system).

Referring now to FIGS. 3 and 4, the meter is connected to either a flange type inlet pipe (as shown in phantom in FIG. 3) or to a threaded inlet pipe (as shown in phantom in FIG. 4), the piping arrangement shown being for in-line piping wherein both inlet and outlet piping share the same centerline. Referring now to FIGS. 5 and 6, the fluid enters into inlet chamber 16; the fluid is shaped by turning vanes 108, 110, and 112 as to be tangential to the vanes 42, 44, and 46 of rotor 38; the fluid enters the arcuate channel 22 (which is formed on the outer side by the lower housing 14, wall 26 and upper housing 12, wall 28 and on the inner side by crescent 20) which is the measurement chamber of the meter when any two vanes (such as 42, 44, or 46) seal the two ends of the arcuate channel 22; the fluid leaves the arcuate channel 22 and is turned by turning vanes 75 to be essentially tangential to the outlet piping; the fluid leaves the meter through outlet chamber 77 and thereby leaves the meter through piping as previously described. The purpose of the seal gate 64 is to pass the vanes 42, 44, and 46 from the outlet side to the inlet side while forming an impediment to fluid short circuiting the arcuate channel 22 (the measurement area); this being accomplished by gate seals 84, 86, and 88 against the surface 32 of the housings 12 and 14, and the inner side of the crescent 20 against the surface 30, and by the seals on each end of the gate as shown by seals 66 and 68.

The volume of fluid contained in a gate pocket between the webs 72, 74, 76 of the gate 64 is unequal; when a gate pocket is against the crescent 20, it is a larger volume than when sealed against the gate cavity 32 (as it now has a vane 42, 44, or 46 in the cavity which displaces fluid). Thus, the vane in the gate pocket displaces fluid causing the fluid volume of the gate return to be less than the fluid volume of the gate pass-through; this unequal gate volume thus becomes part of the total measured volume but happens to be exactly twice half of each of the two vanes sealing the arcuate channel. This mechanical characteristic causes the volume displacement of the vanes to have no effect whatever on the measurement of the meter and allows the capacity per revolution of the meter to be easily calculated by calculating the swept volume of any vane in one revolution.

The rotor 38 contains three drive discs 90, 92, and 94 which are set flush with the rotor surface 40 (as to form a fluid seal with the gate 64 and the crescent 20) and which are rotatable about their centerline in the rotor; each disc has a bushing 78, 79 and 81, respectively, which accept drive pins 82, 83, and 85, respectively, which are fixedly attached to the gate 64 and extend so as to engage the disc bushings 78, 79, and 81. The geometry (as shown in this embodiment) is that the centerlines of the discs 90, 92 and 94 (shown as 87, 89, and 91, respectively) are equidistant from the rotor 38 centerline 50 and positioned radially about the centerline 50 at 120° each; similarly, the pins 82, 83, and 85 are also equidistant from the gate 64 centerline 80 (the same distance as on the rotor) and are also positioned radially about the centerline 80 at 120° each; the distance between the disc bushings 78, 79, and 81 and the disc centerlines 87, 89, and 91, respectively, is each equal to the distance between the gate centerline 80 and the rotor centerline 50. Thus, the rotor, whose vanes are driven by the fluid pressure in the arcuate passage, drives the gate in 1:1 synchronization.

One object of this invention is to provide a rotary meter which is integral to the meter instrument enclosure. This objective is accomplished in this invention by uniquely arranging the meter's rotating components on vertical shafts. There are many advantages to this arrangement which may not be apparent.

Since any fluid meter, especially gaseous fluid meters, has performance criteria which are enhanced by lack of friction or work, the vertical shafting arrangement allows the use of smaller bearings (due to the number of ball bearings in race contact) in light thrust in which the slight, but significant, work required of a horizontal shaft to climb the engaged ball bearing is eliminated (the performance criteria of rangeability is enhanced by the very low tare friction typical of vertical shaft bearing characteristics). Further, the bearing arrangement (see FIG. 3) is significantly protected from the fluid flow as to promote bearing cleanliness from contaminants which will reduce bearing life.

The elimination of traditional right angle gearing (for changing output from horizontal axis to vertical axis of motion) of course, is a reduction of friction (helpful to the performance criteria of rangeability). But even more significant is the elimination of friction related to these modular "right angle instrument mounts" in the two drive couplings (inlet and outlet) and necessary shaft bearings which is unnecessary in its entirety with the vertical shafting arrangement as herein disclosed.

The vertical arrangement of rotor vanes is also a significant advantage over horizontal shaft arrangements in which a sump is created which accumulates trash from the fluid flow; if FIG. 6 were a side view of a typical vane-type rotary meter with horizontal shafting, the bottom wall 26 of the arcuate channel 22 would be the aforementioned sump. With vertical shafting, a table 93 (see FIG. 3) is formed in the lower housing 14 which acts as a seal for the rotor vane tips and gate webs, this table 93 being higher in elevation than the bottom portion of the inlet and outlet passages 16 and 17, respectively, and higher in elevation than the bottom portion of inlet and outlet pipe interiors. Thus, any trash accumulation (or liquid in gaseous fluids) will tend to be rejected by the sweeping action of gate and rotor vanes into the lower level of the piping. The maintenance of constant fluid pressure in the swept area over table 93 also tends to keep fluid contaminants suspended in the fluid, thus enhancing contaminant rejection.

Vertical shafting also enhances bearing relubrication. If oil is introduced at the seal cup 39 (see FIG. 3), it will travel down by gravity over the rotor bearings 34 and 33 to the rotor 38. An oil reservoir in the rotor 38 can then be used to centrifically feed the disc bearings (this detail not shown). Similarly, if oil is introduced from the outside of housing 14 up through a hole through the gate shaft 29 to spill over onto the gate bearing 25 (this detail not shown), the oil will travel down by gravity to the lower gate bearing 27. Thus, the vertical shafting arrangement uses gravity for oil relubrication and eliminates the necessity of an oil sump or individual bearing relubrication ports. This also allows the use of lower friction open bearings (not sealed bearings) which further lowers friction which is detrimental to meter performance. This also causes the oil lubrication of bearings to be a very thin film instead of oil or grease pooling in the bearing which has a significant effect on the meter performance criteria of rangeability.

A more obvious advantage to the vertical shafting arrangement is that the output (see pinion 49 in FIG. 3) is contained within the instrument cover 120. This unique arrangement allows the top portion of the top housing 12 to be used as part of an integral instrument enclosure and eliminates the traditional exterior instrument module including its drive coupling, drive shaft and bearings (added friction), and instrument mounting (additional expense). The ribbing (or gussets) 60 of the upper housing 12 can be conveniently used as mounting pads for instruments, or instrument mounts can be an integral part of the housing 12 (see 140 in FIG. 2). Thus, the additional expense of an instrument case, coupling and drive mechanism, and instrument mounting arrangement is eliminated, making this disclosed arrangement a very good value by providing these functions in addition to other uses.

By having an instrument enclosure right over the meter enclosure, it is possible to eliminate external gas parameter sensing lines, their intrusion (and expense) of tapping into the adjoining pipelines, their compensation, their protection, and their interface to the instrument enclosure.

FIGS. 3, 4 and 5 show one of the turning vanes 110 with an internal bore 114 to the instrument enclosure. The turning vane 110 is fully in the incoming fluid stream and will closely approximate the flowing fluid temperature. This replaces the typical external pipe tap (or welded tap) on the pipeline for a customized thermowell attachment with its attendant field fabrication and part expense and difficulty of ordering specifications. Since the integral thermowell is so close to the instrument, and protected from weather and human involvement (accidental or intentional), there is no need of an attachment cable, sensing line ambient temperature compensation, or interface attachment to the instrument enclosure with its attendant field fabrication and port expense and difficulty of ordering specifications.

FIGS. 3, 4 and 5 also show a typical pressure port 59 from the meter enclosure into the instrument enclosure. This is only a simple illustration of this feature because it is possible to design the upper housing 12 and a "pressure correcting module" (mechanical or electronic) together to provide all types of integral pressure ports manifolded and conveniently switched within the instrument enclosure (details not shown). Such ports can provide inlet and outlet pressure ports for base and differential pressure (making integral differential "meter condition" gages possible), can provide convenient switching of the pressure sensing device from case pressure to an external calibration pressure, and can protect sensitive and delicate electronic sensors within the enclosure. This arrangement eliminates external pipe taps into adjoining piping and its attendant field expense, eliminates external field fitted piping and valving with its attendant expense, eliminates the weather and human exposure factors of such external devices (with much higher inherent safety from fuel gas leaks or theft), and eliminates the interface of external piping to the instrument enclosure with its attendant expense and difficulty of ordering specifications.

Another major advantage of vertical meter component shafting is the significant simplification of meter housing castings and machining. By studying FIGS. 3, 4, 5, and 6, it can be observed that the castings of upper housing 12 and lower housing 14 are both simple pull castings (no side pulls or cores required). Such simplicity makes it possible to cast in multiples even on such high production equipment as aluminum die-cast machines for significant reductions in part costs. Further, it can be observed that all machining is around one axis perpendicular to both the shafting and piping centerlines. This feature allows significant reductions in machining, quality, and inventory costs as such parts can be machined completely in one set-up on a machining center with an index table. Further, the same characteristics are available on the rotating meter elements as both the rotor 38 and gate 64 are simple pull castings easily cast on high production aluminum die casting machines, in multiples if desired (the small holes shown on the tips of vanes 42, 44, and 46 in FIG. 5, and the similar holes shown on gate webs 72, 47 and 76 in FIG. 6 are pre-cast balancing weight holes made possible by die-casting). Such major casting and machining reduction in fabrication costs significantly enhance the commercial viability of the product while significantly improving product quality, and is, therefore, a major advantage of this construction with vertical shafting.

As to the objective of providing convenient external connection holes in the integral instrument enclosure of a rotary meter (for various external functions), refer now to FIG. 2. The interface plate 130 can be a simple stamping with "electrician's knockouts" (holes which are punched but returned into the hole with, perhaps, one connecting web for secure slug holding) and could have slots in the slugs so that a screwdriver can be used to pry out the slug to remove it. Such a plate could be plastic coated to fill in any openings through the plate for weatherproofing and also afford corrosion protection while still providing simple removal of the slugs for a desired hole to the instrument enclosure without field drilling. Such an interface plate can fit into cast slots 19 of the upper housing 12 which, when the instrument cover 120 is closed (as in FIG. 1), provides a weather-tight and secure part of the back wall of the instrument enclosure. Thus, this simple approach eliminates the expense and potential quality degradation of drilling a hole into the instrument enclosure in the field.

As to the objective of providing an electrical generator for a rotary meter integral to the instrument enclosure, it should be pointed out that it is currently the practice to provide gear reduction of the output drive to instrument enclosures on the meter (and not in the instrument enclosure). The practical reason for this is to reduce the previously mentioned friction losses of the shafting, gears, and couplings additionally required for an external instrument housing. However, an electrical generator largely depends on rotational velocity in order to provide meaningful power generation. Thus, the construction shown herein offers a unique characteristic of a high speed shaft within an instrument enclosure. Referring now to FIG. 3, it can be seen that the rotor shaft 31 is within the instrument enclosure. Any high speed shaft could be used (such as the gate shaft 29 if appropriately modified), but the rotor shaft 31 is driven by fluid pressure on its rotor vanes which avoids the friction losses that would occur with any other secondary shaft. Further, the rotor shaft of this construction is conveniently within the instrument enclosure where the generated power would be used.

In the construction shown, the generator field is contained within the pressure hull 10 on the rotor shaft 31. It is noted that the field could also be external to the pressure hull on the pinioned instrument drive shaft 43 (but would add significantly to the workload of the coupling magnet 41). It is also noted that it is possible (and desirable) to combine the function of the rotor coupling drive magnet 37 with the function of the generator field 51, this requiring that the number of poles of such a magnet be the same as the instrument drive driven magnet 41 and the generator 53/55/58/59. It is also noted that the power requirements are so small that the generator field can be simple permanent magnets (powered field coils not needed or desired).

In the construction shown, the generator core could conveniently be added to the meter/instrument in the field by merely sliding the device over the rotor bearing tower 15 (some means of locking the device against torque is needed which can be as simple as a tang on the generator which engages a gusset 60). The type of winding 53 on the iron core 55 is shown as a toroidal winding (to eliminate cogging at startup) but other types of alternator windings could be used with appropriate construction and electronic control. The arrangement of core, windings, control circuitry, and power leads can be any location arrangement as is required.

As to the objective of providing a rotary meter with an integral instrument enclosure which significantly deters fuel theft and vandalism, consider FIG. 1 and FIG. 2. The construction of the upper housing 12 is such that it provides an instrument enclosure with an aluminum die cast cover 120. The cover is so hinged (by "typewriter case" type hinges) that the hinge pins 122 are completely enclosed and inaccessible, and are so trapped (see FIG. 1A) that they cannot be driven out by a tool (such as a punch). This hinge construction, in conjunction with the locking cams 132 and 133 (see FIG. 2) cause the cover 120 to be securely attached to the upper housing 12 when the cover is closed and acts to foil instrument enclosure access by tampering with the hinges. Similarly, the "deadbolt" pins 126, which fit into the upper housing bores 17 and 18 when the cover 120 is closed, act to foil instrument enclosure access by tampering with the cover fit. There is additional protection of this kind of tampering due to the lip on the cover engaging the upper housing surface 61 (see 63 and 61 on FIG. 3). Further protection to undetectable entrance to the instrument enclosure is afforded by a full bezel (not shown) behind the high impact plastic window 121, the interface plate 130, and the cover locks (see FIG. 1B and its description). It should be noted that the locks 125 preferably have anti-rotational steel plates which fit into slots cast into the upper housing 12 (detail not shown), have steel cams which rotate into steel striker plates on the cover (detail not shown), and these cams become self-jamming if the cover were pried apart from the upper housing, such construction being commonly used for high security lock systems. Further, the lock faces have a hardened steel bezel 125 and are recessed into counterbored holes 13 (as shown in FIG. 1B), such construction being commonly used for high security lock systems. The combination of such security measures and construction as herein described renders the instrument enclosure highly secure from undetectable vandalism or entrance.

Since all sensing lines and instruments are internal to the integral instrument enclosure (which is highly protected), the ability to accidentally or intentionally access the meter is highly deterred. Such protection is considerably more secure than the current practice of unlocked external instrument enclosures which are externally bolted to a meter having external pipe ports and connections.

The construction herein disclosed has even further protection against vandalism and fuel theft. While the upper housing 12 and lower housing 14 are attached by bolts (see FIGS. 5 and 6), it is typical of the construction to have two of the bolts assembled from the inside of the instrument enclosure (for example, see bolt holes 95 and 95' in FIGS. 5 and 6), diagonally positioned across the enclosure as to preclude removal of the lower housing 14 from the upper housing 12 even when exterior accessible bolts are removed. Further, in the construction of a flange-type rotary meter (as in FIG. 3), the flange rings 136 are shrink fitted to hold the housings 12 and 14 together even with exterior accessible bolts removed.

As described, such construction of a rotary meter precludes fuel theft by eliminating access or ports to the pipeline or meter which are external to the meter enclosure, and the instrument enclosure is significantly protected from altering the measurement output. To gain access to ports or instruments, significant damage to equipment is required, which is easily detected.

Accordingly, there has been disclosed a rotary meter with an integral instrument enclosure, integral temperature and pressure ports within the enclosure, an integral electric generator within the instrument enclosure, and the whole device made tamper resistant so as to thwart fuel theft. It is understood that the above-described arrangements are merely illustrative of the application of the principles of this invention. Numerous other arrangements may be devised by those skilled in the art without departing from the spirit and scope of this invention, as defined by the appended claims. For example, although a particular type of internal gate rotary vane fluid meter has been disclosed, it is intended that the present invention not be limited to use with that type meter.

I claim:

1. In a rotary fluid meter, the combination of a lower housing and an upper housing together forming a pressure hull for the meter for connection in a pipeline, the lower and upper housings being adapted to contain the rotating measurement elements of the meter on vertical axes of rotation, and a cover adapted for connection to said upper housing to define therewith an enclosure outside said pressure hull for containing fluid measurement instruments, said upper housing being formed with integral instrument mountings outside said pressure hull adapted to be within said enclosure when said cover is connected to said upper housing, said upper and lower housings being joined along a plane which coincides with the centerline of said pipeline.

2. The combination according to claim 1 further including a temperature sensing port formed in said upper housing and communicating directly with the interior of said enclosure, said temperature sensing port being in heat conductive contact with the fluid flowing through the meter.

3. The combination according to claim 2 wherein said upper housing is formed with a fluid flow turning vane extending into said pressure hull and said temperature sensing port includes a bore within said turning vane.

4. The combination according to claim 1 further including a pressure sensing port formed in said upper housing and communicating directly with the interior of said enclosure.

5. The combination according to claim 1 wherein said upper housing includes an exterior wall of said enclosure, and further including a plate having a plurality of knockout plugs and means for mounting said plate on said exterior wall.

6. The combination according to claim 5 wherein said mounting means includes a slot formed on said exterior wall.

7. The combination according to claim 1 wherein said meter includes an output shaft and said upper housing includes a tower extending into said enclosure, said tower being adapted to contain said output shaft therein, and further including an electrical generator coupled to said output shaft through said tower, said electrical generator having rotating field magnets mounted on said output shaft inside said tower within said pressure hull and a stationary coil surrounding said tower within said enclosure.

8. The combination according to claim 1 wherein said cover includes means for deterring unauthorized access to the enclosure.

* * * * *